(12) United States Patent
Liu et al.

(10) Patent No.: US 11,508,324 B2
(45) Date of Patent: Nov. 22, 2022

(54) E-PAPER DISPLAY DEVICE AND A METHOD FOR DRIVING AN E-PAPER DISPLAY PANEL

(71) Applicant: E Ink Holdings Inc., Hsinchu (TW)

(72) Inventors: Shu-Cheng Liu, Hsinchu (TW); Hsiao-Lung Cheng, Hsinchu (TW); Pei-Lin Tien, Hsinchu (TW); Chi-Mao Hung, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 17/344,972

(22) Filed: Jun. 11, 2021

(65) Prior Publication Data

US 2021/0398495 A1 Dec. 23, 2021

(30) Foreign Application Priority Data

Jun. 18, 2020 (TW) ................... 109120512

(51) Int. Cl.
*G09G 3/34* (2006.01)
*G06F 3/041* (2006.01)
*G06F 3/147* (2006.01)
*G06F 1/16* (2006.01)

(52) U.S. Cl.
CPC .......... *G09G 3/344* (2013.01); *G06F 3/0412* (2013.01); *G06F 3/147* (2013.01); *G06F 1/1652* (2013.01)

(58) Field of Classification Search
CPC ............. G09G 3/20; G09G 2310/0224; G09G 2310/0254; G09G 2320/0209; G09G 2380/14; G06F 3/0412; G06F 3/04184; G06F 3/147
See application file for complete search history.

(56) References Cited

U.S. PATENT DOCUMENTS

| | | | | |
|---|---|---|---|---|
| 2005/0104834 A1* | 5/2005 | Tsuchihashi | ......... | G09G 3/2003 345/96 |
| 2007/0057906 A1* | 3/2007 | Johnson | ................. | G09G 3/344 345/107 |
| 2007/0080927 A1* | 4/2007 | Zhou | ..................... | G09G 3/344 345/107 |

(Continued)

FOREIGN PATENT DOCUMENTS

| CN | 103998981 | 9/2016 |
|---|---|---|
| CN | 110313027 | 10/2019 |

(Continued)

*Primary Examiner* — Ryan A Lubit (74) *Attorney, Agent, or Firm* — JCIPRNET (57) ABSTRACT

An E-paper display device including an E-paper display panel and a display driver is provided. The E-paper display panel displays an image. The image includes a first frame and a second frame. The display driver is coupled to the E-paper display panel. The display driver drives the E-paper display panel to display the image. The display driver drives a first pixel group of the E-paper display panel in a first polarity and drives a second pixel group of the E-paper display panel in a second polarity to display the first frame during a first frame period. The first pixel group and the second pixel group are arranged in interlacing. The display driver drives the second pixel group of the E-paper display panel in the first polarity to display the second frame during a second frame period. Moreover, a method for driving an E-paper display panel is also provided.

7 Claims, 8 Drawing Sheets (56) References Cited

U.S. PATENT DOCUMENTS

| | | | |
|---|---|---|---|
| 2007/0091117 A1 | 4/2007 | Zhou et al. | |
| 2007/0212022 A1 | 9/2007 | Zhou et al. | |
| 2007/0262949 A1* | 11/2007 | Zhou | G09G 3/344 |
| | | | 345/107 |
| 2010/0156955 A1 | 6/2010 | Kimura | |
| 2011/0248909 A1 | 10/2011 | Sato | |
| 2013/0113770 A1* | 5/2013 | Kang | G09G 3/3614 |
| | | | 345/96 |
| 2015/0091851 A1* | 4/2015 | Reynolds | G06F 3/0445 |
| | | | 345/174 |

FOREIGN PATENT DOCUMENTS

| | | |
|---|---|---|
| TW | 200539092 | 12/2005 |
| TW | I430001 | 3/2014 |
| TW | I628637 | 7/2018 |

* cited by examiner

E-PAPER DISPLAY DEVICE AND A METHOD FOR DRIVING AN E-PAPER DISPLAY PANEL

CROSS-REFERENCE TO RELATED APPLICATION

This application claims the priority benefit of Taiwan application serial no. 109120512, filed on Jun. 18, 2019. The entirety of the above-mentioned patent application is hereby incorporated by reference herein and made a part of this specification.

BACKGROUND

Technical Field

The invention relates to a display device and a method for driving a display panel, and particularly relates to an E-paper display device and a method for driving an E-paper display panel.

Description of Related Art

At present, a driving method of an E-paper display panel is mainly to scan the panel, and apply a positive voltage or a negative voltage to pixels on the panel to drive particles according to a waveform lookup table. After scanning a plurality of frame periods, the particles are moved to a target position to display color. However, a gate voltage characteristic of a pixel transistor may be shifted or abnormal, and it is easy to cause mutual interference between different pixel lines in a vertical direction due to a capacitance coupling effect to result in incorrect color display, i.e., vertical crosstalk. Moreover, when driving capability of a display driver is insufficient to drive the pixels, it is also easy to cause mutual interference between different pixel columns in a horizontal direction due to the capacitance coupling effect to result in incorrect color display, i.e., horizontal crosstalk.

SUMMARY

The invention is directed to an E-paper display device and a method for driving a display panel thereof, which are capable of mitigating a capacitance coupling effect between pixels.

The invention provides an E-paper display device including an E-paper display panel and a display driver. The E-paper display panel is configured to display an image. The image includes a first frame and a second frame. The display driver is coupled to the E-paper display panel. The display driver is configured to drive the E-paper display panel to display the image. The display driver drives a first pixel group of the E-paper display panel in a first polarity and drives a second pixel group of the E-paper display panel in a second polarity to display the first frame during a first frame period. The first pixel group and the second pixel group are arranged in interlacing. The display driver drives the second pixel group of the E-paper display panel in the first polarity during a second frame period to display the second frame.

In an embodiment of the invention, the display driver does not drive the first pixel group of the E-paper display panel to display the second frame during the second frame period.

In an embodiment of the invention, the display driver drives the E-paper display panel to display the first frame according to a first polarity array during the first frame period. Pixels of the first polarity array include the first polarity and the second polarity. The display driver drives the E-paper display panel to display the second frame according to a second polarity array during the second frame period. Pixels of the second polarity array include the first polarity and a zero polarity. The zero polarity represents that the display driver does not drive the first pixel group of the E-paper display panel during the second frame period.

In an embodiment of the invention, the first pixel group is odd-numbered pixel lines of the E-paper display panel, and the second pixel group is even-numbered pixel lines of the E-paper display panel.

In an embodiment of the invention, the first pixel group is odd-numbered pixel columns of the E-paper display panel, and the second pixel group is even-numbered pixel columns of the E-paper display panel.

In an embodiment of the invention, the first pixel group includes a plurality of first pixels, and the second pixel group includes a plurality of second pixels. The second pixels are located to the top, bottom, left, and right of each first pixel, and the first pixels are located to the top, bottom, left, and right of each second pixel.

The invention provides a method for driving an E-paper display panel, configured to drive the E-paper display panel to display an image. The image includes a first frame and a second frame. The method includes the following steps. A first pixel group of the E-paper display panel is driven in a first polarity and a second pixel group of the E-paper display panel is driven in a second polarity to display the first frame during a first frame period. The second pixel group of the E-paper display panel is driven in the first polarity to display the second frame during a second frame period. The first pixel group and the second pixel group are arranged in interlacing.

In an embodiment of the invention, the step of driving the first pixel group of the E-paper display panel in the first polarity and driving the second pixel group of the E-paper display panel in the second polarity to display the first frame during the first frame period includes the following step. The E-paper display panel is driven to display the first frame according to a first polarity array during the first frame period. Pixels of the first polarity array include the first polarity and the second polarity.

In an embodiment of the invention, the step of driving the second pixel group of the E-paper display panel in the first polarity to display the second frame during the second frame period includes the following step. The E-paper display panel is driven to display the second frame according to a second polarity array during the second frame period. Pixels of the second polarity array include the first polarity.

In an embodiment of the invention, the method for driving the E-paper display panel further includes the following step. The first pixel group of the E-paper display panel is not driven to display the second frame during the second frame period.

In an embodiment of the invention, the step of not driving the first pixel group of the E-paper display panel to display the second frame during the second frame period includes the following step. The E-paper display panel is driven to display the second frame according to the second polarity array during the second frame period. Pixels of the second polarity array further include a zero polarity. The zero polarity represents that a display driver does not drive the first pixel group of the E-paper display panel during the second frame period.

In an embodiment of the invention, the first pixel group is odd-numbered pixel lines of the E-paper display panel, and the second pixel group is even-numbered pixel lines of the E-paper display panel.

In an embodiment of the invention, the first pixel group is odd-numbered pixel columns of the E-paper display panel, and the second pixel group is even-numbered pixel columns of the E-paper display panel.

In an embodiment of the invention, the first pixel group includes a plurality of first pixels, and the second pixel group includes a plurality of second pixels. The second pixels are located to the top, bottom, left, and right of each first pixel, and the first pixels are located to the top, bottom, left, and right of each second pixel.

Based on the above description, in the embodiment of the invention, to drive adjacent pixels with different polarities may mitigate the capacitance coupling effect between the pixels.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
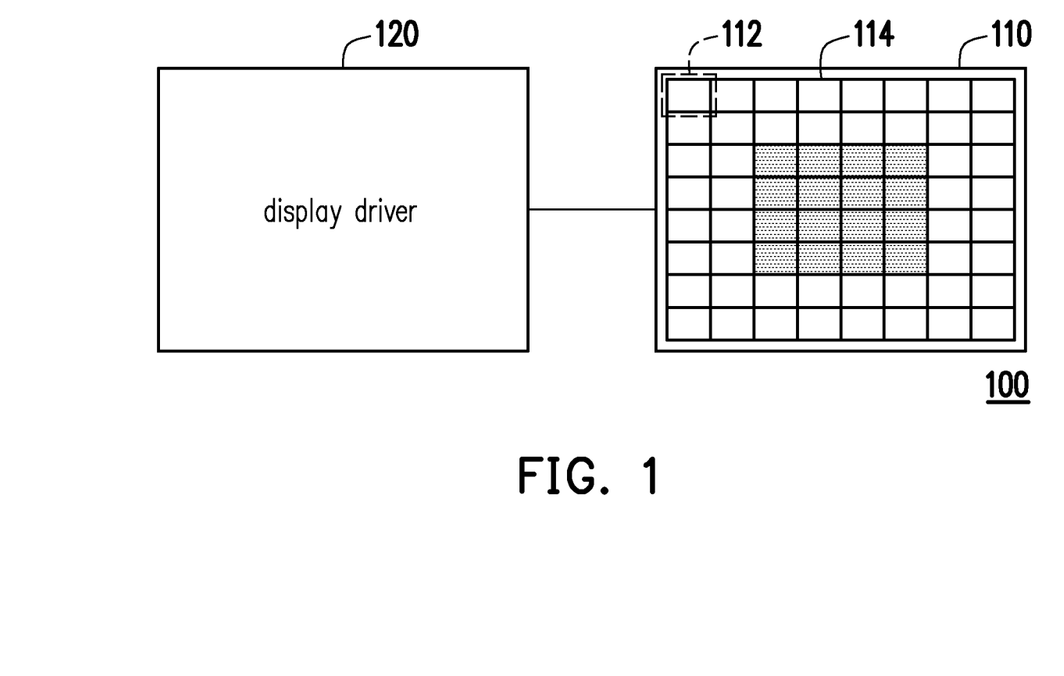
FIG. 1 is a schematic diagram of an E-paper display device according to an embodiment of the invention.

FIG. 1 is a schematic diagram of an E-paper display device according to an embodiment of the invention. Referring to FIG. 1, the E-paper display device 100 of the embodiment includes an E-paper display panel 110 and a display driver 120. The E-paper display panel 110 includes a plurality of pixels 112. The E-paper display panel 110 is configured to display an image 114. The display driver 120 is coupled to the E-paper display panel 110. The display driver 120 is configured to drive the E-paper display panel 110 to display the image 114. The number of pixels and image content shown in FIG. 1 are not used for limiting the invention.

Figure 2:
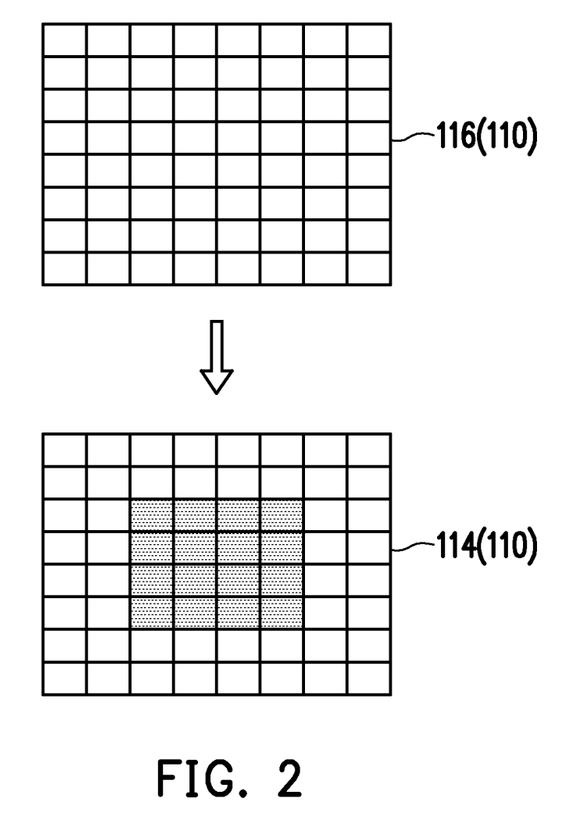
FIG. 2 is a schematic diagram of the E-paper display panel of the embodiment of FIG. 1 updating a displayed image.
Figure 3:
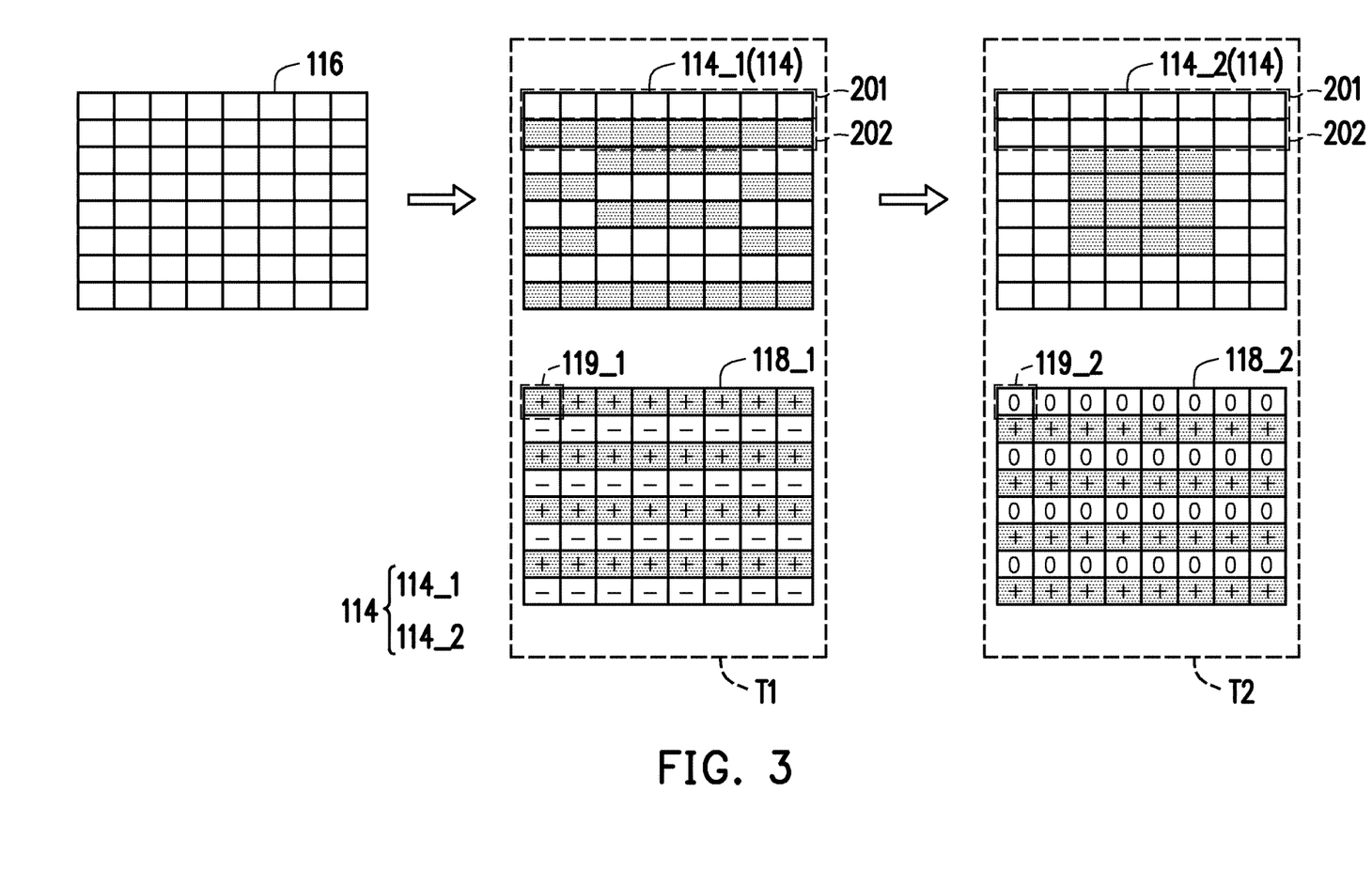
FIG. 3 is a schematic diagram of a flow that the E-paper display panel updates a displayed image according to an embodiment of the invention.

FIG. 2 is a schematic diagram illustrating the E-paper display panel of the embodiment of FIG. 1 updating a displayed image. FIG. 3 is a schematic diagram of a flow that the E-paper display panel updates a displayed image according to an embodiment of the invention. Referring to FIG. 1 to FIG. 3, the display driver 120 drives the E-paper display panel 110 to update display content thereof from initial display content 116 to the image 114, i.e., a target image. The initial display content 116 of the embodiment is, for example, blank, but the invention is not limited thereto.

To be specific, in the embodiment, the image 114 includes a first frame 114_1 and a second frame 114_2. The display driver 120 drive the E-paper display panel 110 to respectively display the first frame 114_1 and the second frame 114_2 in two frame periods T1 and T2 to update the image 114. The display driver 120 drives the E-paper display panel 110 to display the first frame 114_1 according to a first polarity array 118_1 during the first frame period T1. Then, the display driver 120 drives the E-paper display panel 110 to display the second frame 114_2 according to the second polarity array 118_2 during the second frame period T2, and the second frame 114_2 is a target frame, which is an image frame to be displayed on the E-paper display panel 110.

In the embodiment, pixels 119_1 of the first polarity array 118_1 include a first polarity and a second polarity, which are respectively marked as "+" and "−" in FIG. 3. The first polarity marked as "+" represents that the display driver 120 drives the corresponding pixels on the E-paper display panel 110 with a same voltage polarity as that of the target frame, i.e., homodromous driving. The second polarity marked as "−" represents that the display driver 120 drives the corresponding pixels on the E-paper display panel 110 with a voltage polarity different from that of the target frame, i.e., heterodromous driving. Pixels 119_2 of the second polarity array 118_2 include the first polarity and a zero polarity, and the zero polarity is marked as "0" in FIG. 3. The zero polarity marked as "0" represents that the display driver 120 does not drive the corresponding pixels on the E-paper display panel 110.

For example, during the first frame period T1, the display driver 120 drives odd-numbered pixel lines 201 (a first pixel group) of the E-paper display panel 110 in the first polarity, and drives even-numbered pixel lines 202 (a second pixel group) of the E-paper display panel 110 in the second polarity according to the first polarity array 118_1, so as to display the first frame 114_1. During the first frame period T1, since the display driver 120 drives the odd-numbered pixel lines 201 of the E-paper display panel 110 in the first polarity, the odd-numbered pixel lines 201 of the first frame 114_1 and the odd-numbered pixel lines 201 of the target image 114 display the same image content, for example: the same color. Conversely, during the first frame period T1, since the display driver 120 drives the even-numbered pixel lines 202 of the E-paper display panel 110 in the second polarity, the even-numbered pixel lines 202 of the first frame 114_1 and the even-numbered pixel lines 202 of the target image 114 display opposite image content, for example: opposite colors.

Then, during the second frame period T2, the display driver 120 does not drive the odd-numbered pixel lines 201 of the E-paper display panel 110, but drives the even-numbered pixel lines 202 of the E-paper display panel 110 in the first polarity according to the second polarity array 118_2, so as to display the second frame 114_2. During the second frame period T2, since the display driver 120 does not drive the odd-numbered pixel lines 201 of the E-paper display panel 110, the image content displayed by the odd-numbered pixel lines 201 of the second frame 114_2 is remained unchanged, which display the same image content with the odd-numbered pixel lines 201 of the target image 114 and the first frame 114_1. During the second frame period T2, since the display driver 120 drives the even-numbered pixel lines 202 of the E-paper display panel 110 in the first polarity, the even-numbered pixel lines 202 of the second frame 114_2 display the opposite image content with the even-numbered pixel lines 202 of the first frame 114_1, but display the same image content with the even-numbered pixel lines 202 of the target image 114.

In the embodiment, the first pixel group is the odd-numbered pixel lines 201 of the E-paper display panel 110, and the second pixel group is the even-numbered pixel lines 202 of the E-paper display panel 110, and the two groups are arranged in interlacing in a vertical direction. Regarding the E-paper display panel 110, the display driver 120 uses a vertical interlacing type image driving method to drive the E-paper display panel 110 to display the image 114 in the two frame periods T1 and T2. When the display driver 120 drives the E-paper display panel 110 to display the first frame 114_1, the odd-numbered pixel lines 201 are driven forward, and the even-numbered pixel lines 202 are driven backward, as shown in the first polarity array 118_1. Then, when the display driver 120 drives the E-paper display panel 110 to display the second frame 114_2, the even-numbered pixel lines 202 are driven forward, and the odd-numbered pixel lines 202 are not driven, as shown in the second polarity array 118_2. Based on the above driving method, i.e. the adjacent pixels are driven in different polarities, a capacitance coupling effect between the pixels on the E-paper display panel 110 is mitigated.

Figure 4:
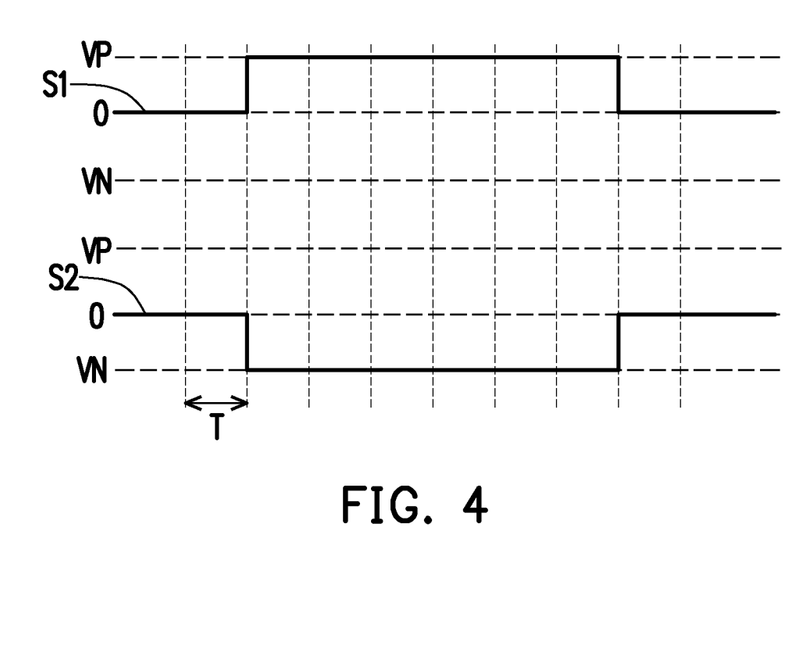
FIG. 4 is a waveform schematic diagram of signals used for driving the E-paper display panel according to an embodiment of the invention.

FIG. 4 is a waveform schematic diagram of signals used for driving the E-paper display panel according to an embodiment of the invention. Referring to FIG. 4, a horizontal axis represents time, and a vertical axis represents voltage. Driving signals S1 and S2 are, for example, respectively signal waveforms for driving the odd-numbered pixel lines 201 and the even-numbered pixel lines 202 during a continuous frame period T. In the continuous frame period T, the odd-numbered pixel lines 201 are driven by a positive voltage VP, and the even-numbered pixel lines 202 are driven by a negative voltage VN, as shown in the first polarity array 118_1. Since the adjacent pixel lines are driven in different polarities, the capacitance coupling effect between the pixel lines on the E-paper display panel 110 may be mitigated.

Figure 5:
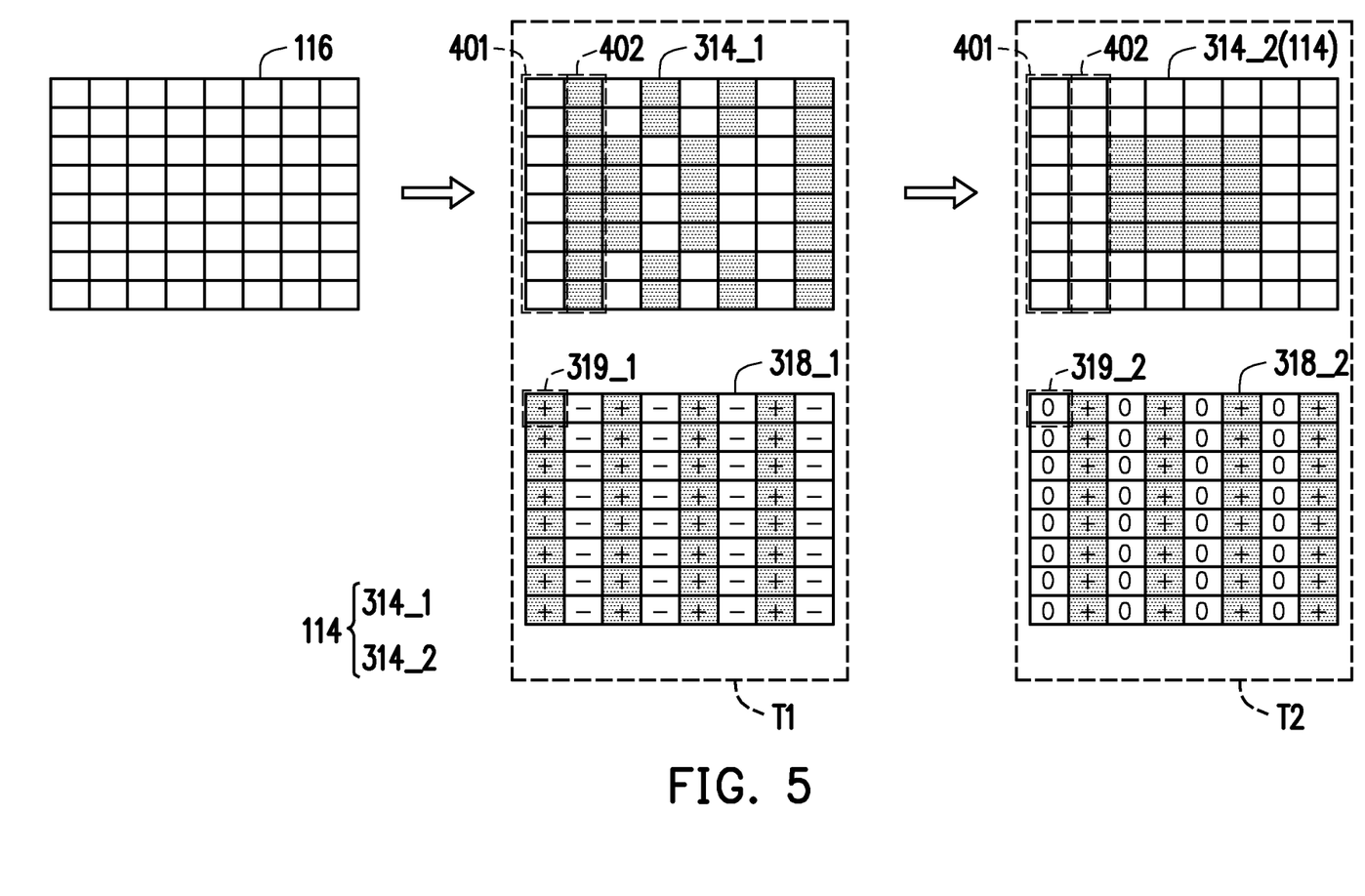
FIG. 5 is a schematic diagram of a flow that the E-paper display panel updates a displayed image according to another embodiment of the invention.

FIG. 5 is a schematic diagram of a flow that the E-paper display panel updates a displayed image according to another embodiment of the invention. Referring to FIG. 5, the display driver 120 of the embodiment uses a horizontal interlacing type image driving method to drive the E-paper display panel 110 to display the image 114 in the two frame periods T1 and T2, and the display content is updated from the initial display content 116 to the image 114, as shown in FIG. 2.

To be specific, in the embodiment, the image 114 includes a first frame 314_1 and a second frame 314_2. The display driver 120 drives the E-paper display panel 110 to respectively display the first frame 314_1 and the second frame 314_2 in the two frame periods T1 and T2 to update the image 114. The display driver 120 drives the E-paper display panel 110 to display the first frame 314_1 according to a first polarity array 318_1 during the first frame period T1. Then, the display driver 120 drives the E-paper display panel 110 to display the second frame 314_2 according to a second polarity array 318_2 during the second frame period T2.

In the embodiment, pixels 319_1 of the first polarity array 318_1 include a first polarity and a second polarity, which are respectively marked as "+" and "−" in FIG. 5. Pixels 319_2 of the second polarity array 318_2 include the first polarity and a zero polarity, and the zero polarity is marked as "0" in FIG. 5.

For example, during the first frame period T1, the display driver 120 drives odd-numbered pixel columns 401 (the first pixel group) of the E-paper display panel 110 in the first polarity, and drives even-numbered pixel columns 402 (the second pixel group) of the E-paper display panel 110 in the second polarity according to the first polarity array 318_1, so as to display the first frame 314_1. During the first frame period T1, since the display driver 120 drives the odd-numbered pixel columns 401 of the E-paper display panel 110 in the first polarity, the odd-numbered pixel columns 401 of the first frame 314_1 and the odd-numbered pixel columns 401 of the target image 114 display the same image content. Conversely, during the first frame period T1, since the display driver 120 drives the even-numbered pixel columns 402 of the E-paper display panel 110 in the second polarity, the even-numbered pixel columns 402 of the first frame 114_1 and the even-numbered pixel columns 402 of the target image 114 display opposite image content.

Then, during the second frame period T2, the display driver 120 does not drive the odd-numbered pixel columns 401 of the E-paper display panel 110, but drives the even-numbered pixel columns 402 of the E-paper display panel 110 in the first polarity according to the second polarity array 318_2, so as to display the second frame 314_2. During the second frame period T2, since the display driver 120 does not drive the odd-numbered pixel columns 401 of the E-paper display panel 110, the image content displayed by the odd-numbered pixel columns 401 of the second frame 314_2 is remained unchanged, which display the same image content with the odd-numbered pixel columns 401 of the target image 114 and the first frame 314_1. During the second frame period T2, since the display driver 120 drives the even-numbered pixel columns 402 of the E-paper display panel 110 in the first polarity, the even-numbered pixel columns 402 of the second frame 314_2 display the opposite image content with the even-numbered pixel columns 402 of the first frame 314_1, but display the same image content with the even-numbered pixel columns 402 of the target image 114.

In the embodiment, the first pixel group is the odd-numbered pixel columns 401 of the E-paper display panel 110, and the second pixel group is the even-numbered pixel columns 402 of the E-paper display panel 110, and the two groups are arranged in interlacing in a horizontal direction. Regarding the E-paper display panel 110, the display driver 120 uses the horizontal interlacing type image driving method to drive the E-paper display panel 110 to display the image 114 in the two frame periods T1 and T2. When the display driver 120 drives the E-paper display panel 110 to display the first frame 314_1, the odd-numbered pixel columns 401 are driven forward, and the even-numbered pixel columns 402 are driven backward, as shown in the first polarity array 318_1. Then, when the display driver 120 drives the E-paper display panel 110 to display the second frame 314_2, the even-numbered pixel columns 402 are driven forward, and the odd-numbered pixel columns 402 are not driven, as shown in the second polarity array 318_2.

Based on the above driving method, the capacitance coupling effect between the pixels on the E-paper display panel 110 is mitigated.

Figure 6:
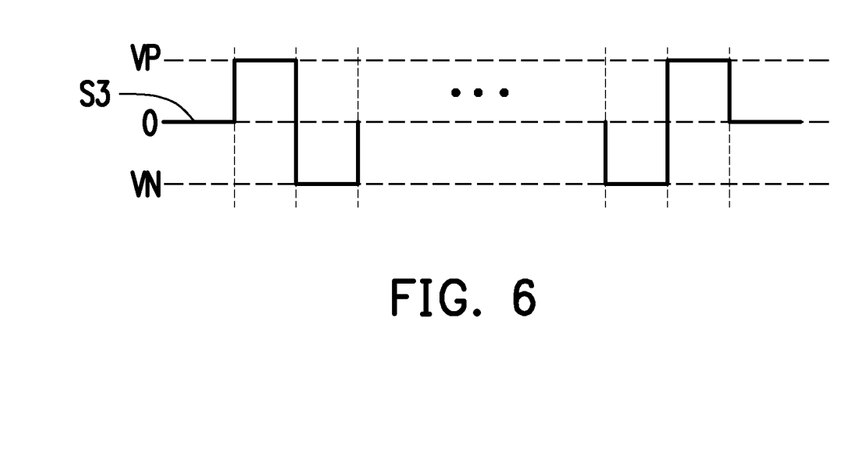
FIG. 6 is a waveform schematic diagram of signals used for driving the E-paper display panel according to another embodiment of the invention.

FIG. 6 is a waveform schematic diagram of signals used for driving the E-paper display panel according to another embodiment of the invention. Referring to FIG. 6, a horizontal axis represents pixel, and a vertical axis represents voltage. A driving signal S3 is, for example, a signal waveform for driving adjacent pixels of a same pixel line during a same frame period. In the same frame period, the odd-numbered pixel columns 401 are driven by the positive voltage VP, and the even-numbered pixel columns 402 are driven by the negative voltage VN, as shown in the first polarity array 318_1. Since the adjacent pixel columns are driven in different polarities, the capacitance coupling effect between the pixel columns on the E-paper display panel 110 may be mitigated.

Figure 7:
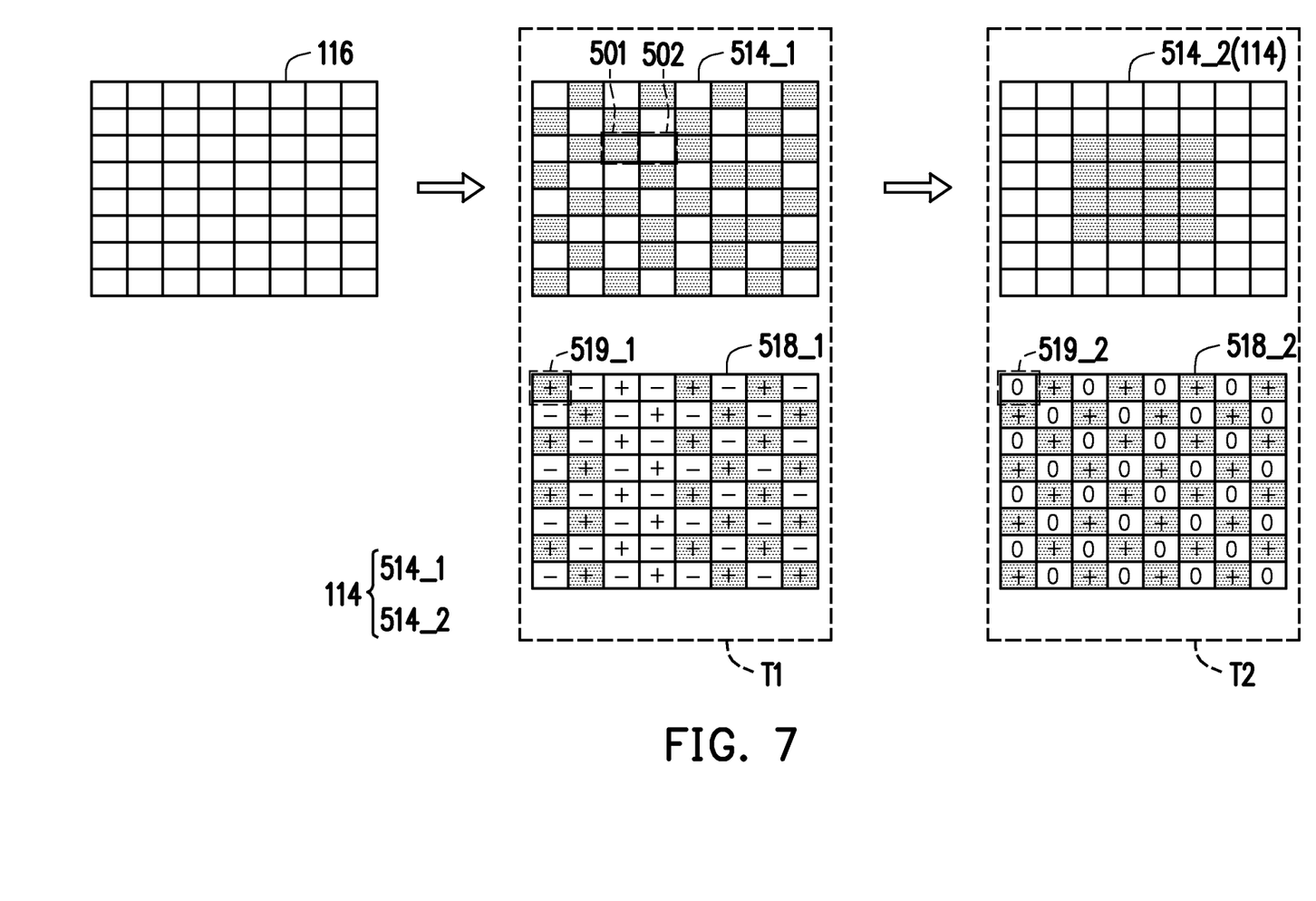
FIG. 7 is a schematic diagram of a flow that the E-paper display panel updates a displayed image according to another embodiment of the invention.

FIG. 7 is a schematic diagram of a flow that the E-paper display panel updates a displayed image according to another embodiment of the invention. Referring to FIG. 7, the display driver 120 of the embodiment uses a point interlacing type image driving method to drive the E-paper display panel 110 to display the image 114 in the two frame periods T1 and T2, and the display content is updated from the initial display content 116 to the image 114, as shown in FIG. 2.

To be specific, in the embodiment, the image 114 includes a first frame 514_1 and a second frame 514_2. The display driver 120 drives the E-paper display panel 110 to respectively display the first frame 514_1 and the second frame 514_2 in the two frame periods T1 and T2 to update the image 114. The display driver 120 drives the E-paper display panel 110 to display the first frame 514_1 according to a first polarity array 518_1 during the first frame period T1. Then, the display driver 120 drives the E-paper display panel 110 to display the second frame 514_2 according to a second polarity array 518_2 during the second frame period T2.

In the embodiment, pixels 519_1 of the first polarity array 518_1 include the first polarity and the second polarity, which are respectively marked as "+" and "−" in FIG. 7. The pixels 519_1 marked as "+" and the pixels 519_1 marked as "−" are arranged in interlacing on the first polarity array 518_1 in a checkerboard manner. Namely, the pixels 519_1 marked as "−" are located to the top, bottom, left, and right of each pixel 519_1 marked as "+", and the pixels 519_1 marked as "+" are located to the top, bottom, left, and right of each pixel 519_1 marked as "−".

The pixels 519_1 marked as "+" on the first polarity array 518_1 are used to drive the first pixel group, and the pixels 519_1 marked as "−" on the first polarity array 518_1 are used to drive the second pixel group. The first pixel group includes a plurality of first pixels 501, and the second pixel group includes a plurality of second pixels 502. The second pixels 502 are located to the top, bottom, left, and right of each first pixel 501, and the first pixels 501 are located to the top, bottom, left, and right of each second pixel 502. Namely, the first pixel group and the second pixel group are arranged in interlacing on the electronic paper display panel 110 in the checkerboard manner.

Pixels 519_2 of the second polarity array 518_2 include the first polarity and the zero polarity, and the zero polarity is marked as "0" in FIG. 7. The pixels 519_2 marked as "0" and the pixels 519_2 marked as "+" are arranged in interlacing on the second polarity array 518_2 in the checkerboard manner. The pixels 519_2 marked as "0" on the second polarity array 518_2 are used to drive the first pixel group, and the pixels 519_2 marked as "+" on the second polarity array 518_2 are used to drive the second pixel group.

For example, during the first frame period T1, the display driver 120 drives the first pixel group of the E-paper display panel 110 in the first polarity, and drives the second pixel group of the E-paper display panel 110 in the second polarity according to the first polarity array 518_1, so as to display the first frame 514_1. During the first frame period T1, since the display driver 120 drives the first pixel group of the E-paper display panel 110 in the first polarity, the first pixel group of the first frame 514_1 and the first pixel group of the target image 114 display the same image content. Conversely, during the first frame period T1, since the display driver 120 drives the second pixel group of the E-paper display panel 110 in the second polarity, the second pixel group of the first frame 114_1 and the second pixel group of the target image 114 display opposite image content.

Then, during the second frame period T2, the display driver 120 does not drive the first pixel group of the E-paper display panel 110, but drives the second pixel group of the E-paper display panel 110 in the first polarity according to the second polarity array 518_2, so as to display the second frame 514_2. During the second frame period T2, since the display driver 120 does not drive the first pixel group of the E-paper display panel 110, the image content displayed by the first pixel group of the second frame 514_2 is remained unchanged, which display the same image content with the first pixel group of the target image 114 and the first frame 514_1. During the second frame period T2, since the display driver 120 drives the second pixel group of the E-paper display panel 110 in the first polarity, the second pixel group of the second frame 514_2 display the opposite image content with the second pixel group of the first frame 514_1, but display the same image content with the second pixel group of the target image 114.

In the embodiment, the first pixel group and the second pixel group are arranged in interlacing on the E-paper display panel 110 in the checkerboard manner. Regarding the E-paper display panel 110, the display driver 120 uses the point interlacing type image driving method to drive the E-paper display panel 110 to display the image 114 in the two frame periods T1 and T2. When the display driver 120 drives the E-paper display panel 110 to display the first frame 514_1, the first pixel group is driven forward, and the second pixel group is driven backward, as shown in the first polarity array 518_1. Then, when the display driver 120 drives the E-paper display panel 110 to display the second frame 514_2, the second pixel group is driven forward, and the first pixel group is not driven, as shown in the second polarity array 518_2. Based on the above driving method, the capacitance coupling effect between the pixels on the E-paper display panel 110 is mitigated.

Figure 8:
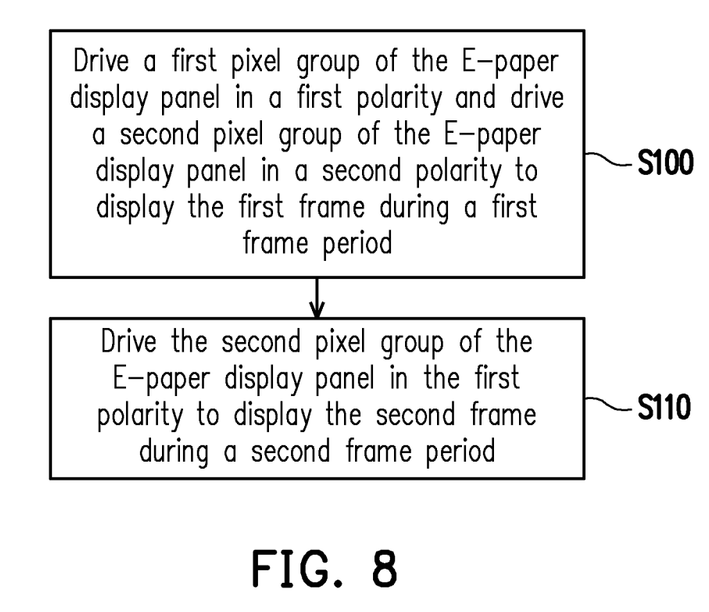
FIG. 8 is a flowchart illustrating a method for driving an E-paper display panel according to an embodiment of the invention.

FIG. 8 is a flowchart illustrating a method for driving an E-paper display panel according to an embodiment of the invention. Referring to FIG. 1 and FIG. 8, the method of the embodiment is at least adapted to the E-paper display device 100 of FIG. 1, but the invention is not limited thereto. Taking the E-paper display device 100 as an example, in step S100, the display driver 120 drives the first pixel group of the E-paper display panel 100 in the first polarity and drives the second pixel group of the E-paper display panel 100 in the second polarity during the first frame period T1 to display the first frame. In step S110, the display driver 120 drives the second pixel group of the E-paper display panel 110 in the first polarity during the second frame period T2 to display the second frame. Moreover, regarding the method for driving the E-paper display panel of the embodiment of the invention, enough instructions, recommendations and implementation instructions may be get from the description of the embodiments of FIG. 1 to FIG. 7.

In summary, in the embodiment of the invention, the display driver may use a vertical interlacing type, horizontal interlacing type or point interlacing type image driving method to drive the E-paper display panel to display the target image in two frame periods. Therefore, to drive the adjacent pixels with different polarities may reduce the capacitance coupling effect between the pixels.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. An E-paper display device, comprising:
   an E-paper display panel, configured to display an image, wherein the image comprises a first frame and a second frame; and
   a display driver, coupled to the E-paper display panel and configured to drive the E-paper display panel to display the image,
   wherein the display driver drives a first pixel group of the E-paper display panel in a first polarity and drives a second pixel group of the E-paper display panel in a second polarity to display the first frame during a first frame period, wherein the first pixel group and the second pixel group are interlaced; and
   the display driver drives the second pixel group of the E-paper display panel in the first polarity to display the second frame during a second frame period;
   wherein the display driver does not drive the first pixel group of the E-paper display panel to display the second frame during the second frame period.

2. The E-paper display device as claimed in claim 1, wherein
   the display driver drives the E-paper display panel to display the first frame according to a first polarity array during the first frame period, wherein pixels of the first polarity array comprise the first polarity and the second polarity; and
   the display driver drives the E-paper display panel to display the second frame according to a second polarity array during the second frame period, wherein pixels of the second polarity array comprise the first polarity and a zero polarity, and the zero polarity represents that the display driver does not drive the first pixel group of the E-paper display panel during the second frame period.

3. The E-paper display device as claimed in claim 1, wherein the first pixel group is odd-numbered pixel lines of the E-paper display panel, and the second pixel group is even-numbered pixel lines of the E-paper display panel.

4. The E-paper display device as claimed in claim 1, wherein the first pixel group is odd-numbered pixel columns of the E-paper display panel, and the second pixel group is even-numbered pixel columns of the E-paper display panel.

5. The E-paper display device as claimed in claim 1, wherein the first pixel group comprises a plurality of first pixels, the second pixel group comprises a plurality of second pixels, the second pixels are located to top, bottom, left, and right of each first pixel, and the first pixels are located to top, bottom, left, and right of each second pixel.

6. A method for driving an E-paper display panel, configured to drive the E-paper display panel to display an image, wherein the image comprises a first frame and a second frame, the method for driving the E-paper display panel comprising:
   driving a first pixel group of the E-paper display panel in a first polarity and driving a second pixel group of the E-paper display panel in a second polarity to display the first frame during a first frame period, wherein the first pixel group and the second pixel group are interlaced; and
   driving the second pixel group of the E-paper display panel in the first polarity to display the second frame during a second frame period;
   wherein the step of driving the first pixel group of the E-paper display panel in the first polarity and driving the second pixel group of the E-paper display panel in he second polarity to display the first frame during the first frame period comprises:
   driving the E-paper display panel to display the first frame according to a first polarity array during the first frame period, wherein pixels of the first polarity array comprise the first polarity and the second polarity; and
   wherein the step of driving the second pixel group of the E-paper display panel in the first polarity to display the second frame during the second frame period comprises:
   driving the E-paper display panel to display the second frame according to a second polarity array during the second frame period, wherein pixels of the second polarity array comprise the first polarity; and
   not driving the first pixel group of the E-paper display panel to display the second frame during the second frame period.

7. The method for driving the E-paper display panel as claimed in claim 6, wherein the step of not driving the first pixel group of the E-paper display panel to display the second frame during the second frame period comprises:
   driving the E-paper display panel to display the second frame according to the second polarity array during the second frame period,
   wherein pixels of the second polarity array further comprise a zero polarity, and the zero polarity represents that a display driver does not drive the first pixel group of the E-paper display panel during the second frame period.

* * * * *